United States Patent
Behrens et al.

(10) Patent No.: US 7,761,483 B2
(45) Date of Patent: Jul. 20, 2010

(54) SYSTEM AND METHOD FOR PROVIDING DATA HANDLING WITHIN A HUMAN CAPITAL MANAGEMENT SYSTEM

(75) Inventors: Christian Behrens, Wiesloch (DE); Steffen Rotsch, Rauenberg (DE); Martin Scholz, Nußloch (DE)

(73) Assignee: SAP AG, Walldorf (DE)

( * ) Notice: Subject to any disclaimer, the term of this patent is extended or adjusted under 35 U.S.C. 154(b) by 332 days.

(21) Appl. No.: 11/829,155

(22) Filed: Jul. 27, 2007

(65) Prior Publication Data

US 2009/0030938 A1  Jan. 29, 2009

(51) Int. Cl.
*G06F 7/00* (2006.01)
*G06F 17/00* (2006.01)

(52) U.S. Cl. ................... 707/804; 707/805
(58) Field of Classification Search ............... None
See application file for complete search history.

(56) References Cited

U.S. PATENT DOCUMENTS

| | | | |
|---|---|---|---|
| 6,115,549 A * | 9/2000 | Janis et al. ............. | 717/172 |
| 6,279,008 B1 * | 8/2001 | Ng et al. ............... | 707/102 |
| 6,374,256 B1 * | 4/2002 | Ng et al. ............... | 707/103 R |
| 6,470,494 B1 * | 10/2002 | Chan et al. ............ | 717/166 |
| 7,127,703 B1 * | 10/2006 | Nachef et al. ........ | 717/108 |
| 7,130,863 B2 * | 10/2006 | Diab ..................... | 707/103 R |
| 7,316,002 B1 * | 1/2008 | Armand et al. ........ | 717/109 |
| 2002/0055870 A1 * | 5/2002 | Thomas ................ | 705/10 |
| 2003/0126592 A1 * | 7/2003 | Mishra et al. ......... | 717/176 |
| 2004/0243428 A1 * | 12/2004 | Black et al. ........... | 705/1 |
| 2005/0066306 A1 * | 3/2005 | Diab ..................... | 717/108 |
| 2006/0069666 A1 * | 3/2006 | Burke et al. ........... | 707/2 |
| 2006/0167946 A1 * | 7/2006 | Hellman et al. ....... | 707/104.1 |
| 2007/0130136 A1 * | 6/2007 | Cambot et al. ........ | 707/4 |

* cited by examiner

*Primary Examiner*—Kuen S Lu
*Assistant Examiner*—Tuan Pham
(74) *Attorney, Agent, or Firm*—Kenyon & Kenyon LLP

(57) ABSTRACT

A method and system are provided for accessing customized tables in a database of a computer application. The method includes defining a data class, the data class to interface between a tool of the computer application and a table in the database, wherein the computer application is configured to automated human resource processes. The method includes registering the data class in a custom table directory. The method includes responsive to a request for data from the tool, invoking a method of the data class to access data stored in the table.

15 Claims, 4 Drawing Sheets

SYSTEM AND METHOD FOR PROVIDING DATA HANDLING WITHIN A HUMAN CAPITAL MANAGEMENT SYSTEM

BACKGROUND

A human capital management (HCM) system may automate various human resource processes. For example, a HCM system may automate the functionality of hiring a new employee, terminating an existing employee, reassigning an employee, granting extended leave, etc. Each functionality may require one or more approvals before the request is granted, and the HCM system automates the process of generating the appropriate requests and collecting completed approvals before granting the request if the process was successfully completed. In addition, a HCM system may provide various workforce analytics, which quantifies various aspects of human resources management within the HCM system. To set up such a process, various customizing tables are required to be maintained by customers.

Within the HCM system, various tools are implemented to provide functionality for maintaining these customizing tables. Previously, tools would be individually programmed, leading to problems maintaining consistent interfaces and behaviours among different tools.

Object-oriented programming (OOP) is a programming paradigm that uses "objects" to design applications and programs. OOP emphasizes modularity in software by treating the application or program as a collection of cooperating objects, as opposed to a traditional view in which a program is a list of instructions to the computer. Each object is capable of receiving messages, processing data, and sending messages to other objects. Thus, each object can be viewed as an independent machine with a distinct role or responsibility. The emphasis on modularity promotes greater flexibility and maintainability compared to previous approaches.

Within the HCM system, functionality may be provided by tools. Tools may be objects instantiated from tool classes, which define objects including methods and properties that provide the required functionality.

Within the HCM system, data is stored in tables of a database. The HCM system may include functionality to access the data, such as the following: Read the definitions from data base, Write the definitions to data base, Delete the definitions from the database, Rename or Copy the object, Lock against concurrent change accesses and unlock, Create a transport request from an object, check for existence, discard any changes previously made.

As can be seen, a variety of functionality is necessary to provide data access. One method of providing this functionality is to write specific code for each customized table to fulfill specific tasks. Unfortunately, this approach makes the code difficult to maintain and upgrade.

Thus, a need exists to provide access to data stored on a database in a HCM system.

DETAILED DESCRIPTION

A method and system provide generic access to customized tables in a database accessible to a HCM system. Functionality in the HCM system is provided by tools instantiated from tool classes, and the tools may access tables in the database. Each table includes a reference to a top level object within the HCM system. When a new table or data class is created in the database, it is registered with the HCM system and generic functionality as defined by the abstract object classes will be provided.

This approach eliminates the need to program the same functionality for different tables. When additional objects are added to the HCM system, they will include the existing functionality provided by previous objects. Customized tables that require special functionality will be defined with special code associated with the table.

Figure 1:
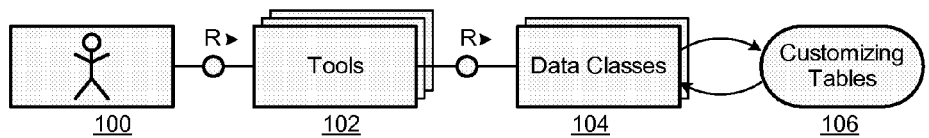
FIG. 1 depicts an example relationship between tools and data classes in accordance with an embodiment of the present invention.

FIG. 1 depicts an example relationship between tools and data classes in accordance with an embodiment of the present invention. A user 100 may interact with tools 102 in an HCM system, as discussed later. Tools 102 may provide functionality of the HCM system to the user 100.

Tools 102 may interact with data classes 104, which provide access to data stored in tables on a database of the HCM system. The data classes 104 may include properties and methods that are accessible to tools 102.

Data in the HCM system may be stored in customized tables 106, which are stored on a database. Tools 102 may only access data through data classes 104. Dividing functional responsibility between user interface and data access promotes modularity and software maintenance.

For example, tools 102 may be instantiated from tool classes. Thus, each tool is an object, and may require access to the customized tables 106.

The data classes 104 and customized tables 106 may be stored in a customized table directory. Each data class in the HCM system may be required to register its customized tables in the customized table directory, where customized tables as associated with the data class to which they belong, as well as properties of the customized table. For example, an entry in the customized table directory may include an object type ID, a table name, whether more than one entry may exist for one object, whether the table is language dependent, whether the table is time dependent, etc.

It should be appreciated that any number of properties may be associated with a customized table, dependent on what the data class requirements are.

When the HCM system accesses a data class for the first time during execution, for example, by instantiating and executing a data object from the data class, it registers all customized tables associated with the data class in the customized table directory. When a data object is accessed and modified by invoking a method associated with the data object, the method first reads the customized table directory to determine all customized tables associated with the data object. The method can then access all customized tables associated with the data object for a read, modification, or other operation.

Figure 2:
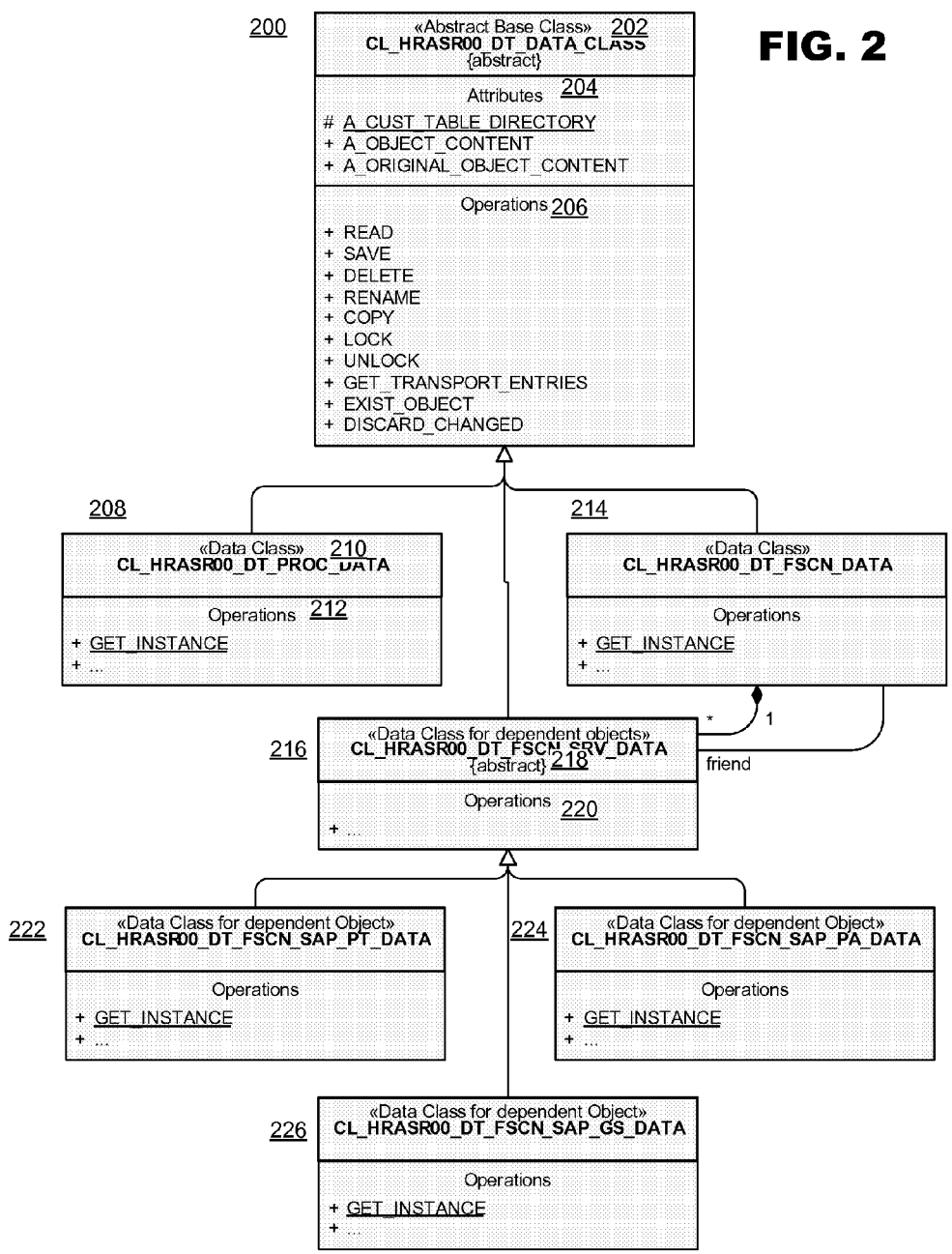
FIG. 2 depicts an example class diagram in accordance with an embodiment of the present invention.

FIG. 2 depicts an example class diagram in accordance with an embodiment of the present invention. An abstract base class 200 may include a class definition 202, attributes 204 and operations 206. A class definition associated with a class may include a name of the class. Attributes may be properties associated with an object. Operations may be methods associated with an object.

The abstract base class contains the customized table directory and provides an interface to common functionality available to all data classes within the HCM system. Data classes will be defined to implement object-specific functionality. During runtime, there will be one instance of the derived class for each object that is accessed by the HCM system. The customized table directory is a static attribute and therefore common to all instances of data classes, which inherit from the abstract base class 200. The abstract base class 200 also provides methods implementing common functionality. Functionality may be implemented, as discussed below.

For example, data classes within the HCM system may all inherit from the abstract base class, thereby providing a common customized table directory and a common interface to common functionality.

A data class 210 may inherit from abstract base class 200 and include a class definition 210 and operations 212. The data class 210 may define an object which may be instantiated, which provides access to data in the HCM system to a tool, as discussed above.

Similarly, a data class 214 may also inherit from abstract base class 200 and be similar to the data class 210.

A data class for dependent object 216 may inherit from abstract base class 200 or a data class 208 or 214. The data class for dependent object 216 may be abstract and include a class definition 218 and operations 220.

Similarly, there may be data classes for dependent objects 222, 224 and 226.

Figure 3:
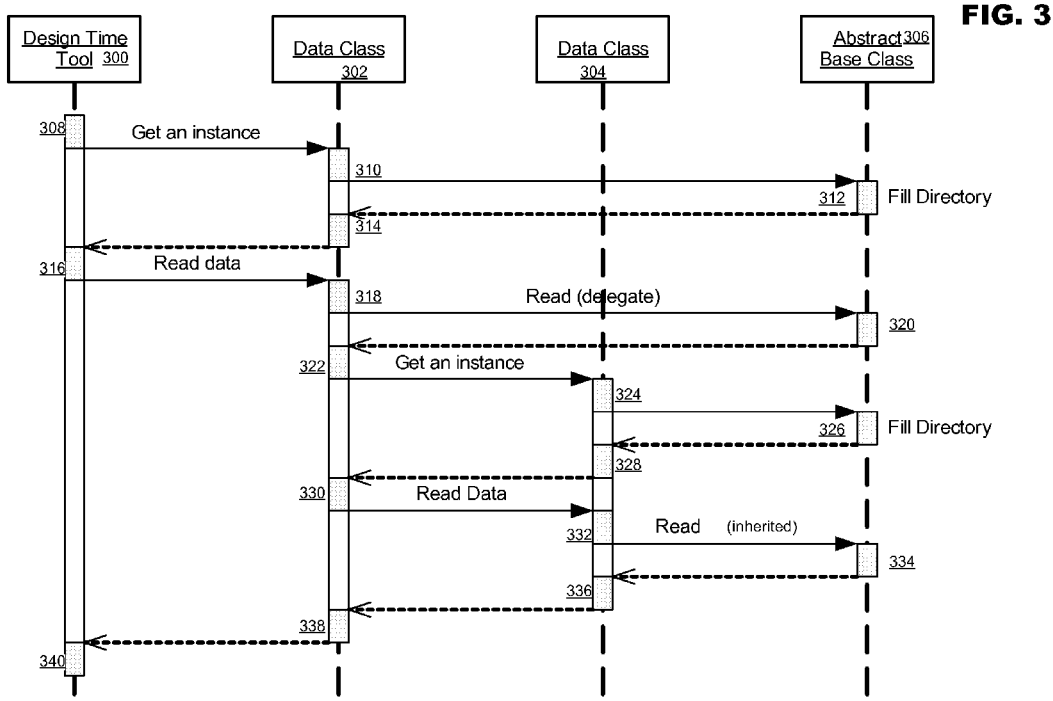
FIG. 3 depicts an example process flow between a design time tool and associated classes in accordance with an embodiment of the present invention.

FIG. 3 depicts an example process flow between a design time tool and associated classes in accordance with an embodiment of the present invention. In this example, data is requested by a design time tool 300, a tool in the HCM system.

For example, design time tool 300 may be configured to display a form scenario along with its dependent objects. Data class 302 and dependent data class 304 may be accessed by the design time tool 300. Data classes 302 and 304 may inherit from the abstract base class 306.

In 308, a data object is instantiated from data class 302. In 310, the data object has been instantiated and the HCM system checks whether the data class 302 has previously been accessed. If the data object has not been previously accessed, the custom table directory is filled in 312 with relevant information of the data class 302.

The relevant information of the data class 302 is accessed in 314 and stored in the customized table directory of the abstract base class 306.

The design time tool 300 may invoke a read method of the data object in 316. In 318, the data object passes the read request to the abstract base class 306. The abstract base class 306 retrieves a list of tables associated with the data class 302 and returns it to the data class 302 in 320.

In 322, the data object instantiates a dependent data object of dependent data class 304. Similar to 310, the dependent data object is checked for whether it has been previously accessed. If not, the dependent data class 304 is added to the customized table directory in 326.

The relevant information of the dependent data class 324 is accessed in 328 and stored in the customized table directory of the abstract base class 306.

In 330, the data object invokes a read method in the dependent object to complete its own read method. In 332, the dependent object invokes its read method, which may be inherited from the abstract base class 306 (as depicted). The read method is then retrieved from the abstract base class 306 in 334, and invoked. Retrieved data is returned to the dependent object at 336, and then further returned to the data object at 338. Finally, the retrieved data is returned to the design tool 300 at 340.

To read the correct data in a read operation, the customized table directory must be evaluated and only relevant tables associated with the data class associated with the data object must be processed.

It will be appreciated that other functions may be implemented on the data classes of the HCM system. For example, an object may be renamed, copied, or deleted. Data entries within tables may be added, changed, and deleted.

Figure 4:
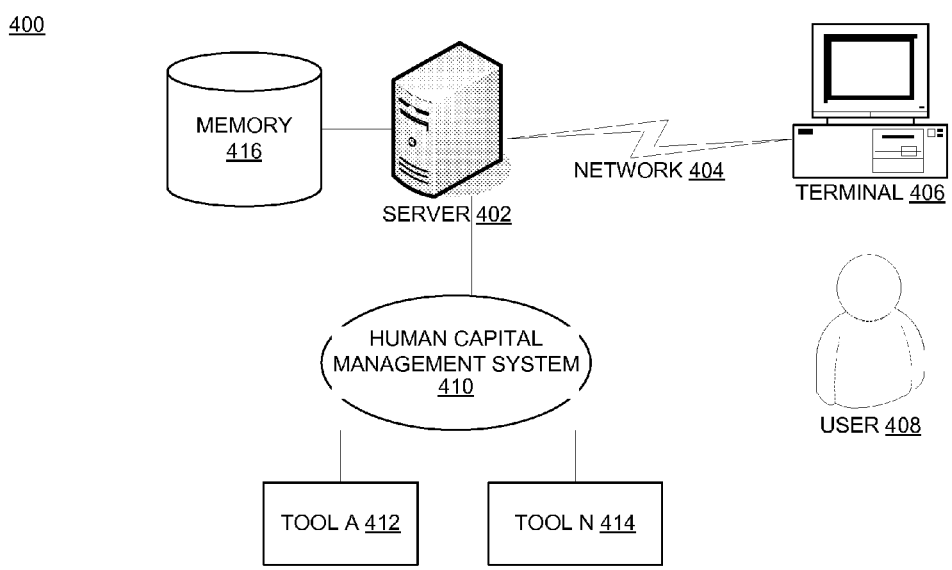
FIG. 4 depicts an example system for executing a human capital management system in accordance with an embodiment of the present invention.

FIG. 4 depicts an example system for executing a human capital management system in accordance with an embodiment of the present invention. A system 400 may be configured to execute a computer application such as HCM system, for example, in an enterprise environment. The HCM system may automate human resources functions within the enterprise.

The system 400 may include a server 402. The server 402 may include a processor configured to execute computer instructions stored in a memory, for example, the HCM system. The server 402 may include a variety of security and backup measures to ensure continual operation and data security. While only one server is depicted, it will be appreciated that a distributed system of servers may be used.

The server 402 may be in communication with a terminal 406 over a network 404. The network 404 may be configured to communicate information between the server 402 and the terminal 406, and be the Internet, a local network, a Wide Area Network, a wireless network or other network or communication scheme.

The terminal 406 may interact with a user 408. For example, the terminal 406 may be a personal computer, a mobile device, a wireless device, or any other device configured to interact with the user 408 and communicate with the server 402 over the network 404.

The user 408 may be an authorized user of the system with permission to utilize the HCM system. For example, the user 408 may be a human resources administrator within an enterprise authorized to use the HCM system.

The server 402 may execute a HCM system 410. The HCM system 410 may be a computer application and include classes and objects as discussed above.

The HCM system 410 may include instantiated tools 412 and 414. The tools 412 and 414 may be instantiated from tool classes as discussed above.

The server 402 may be in communication with a database 416. The database 416 may be a medium configured to store data related to the HCM system 410. For example, the database 416 may be a hard drive, a RAID array, or any other rewritable medium. The database 416 may be accessible to the HCM system 410. The database 416 may be physically located in a geographically separate location from the server 202 for data security or other purposes. Data stored within the database 416 may be accessed by the HCM system 410 via data classes, as discussed above.

Data classes, abstract data classes, tool classes, instantiated data objects, and instantiated tools may be stored in Memory 416, where they are accessible to the HCM system 410.

Figure 5:
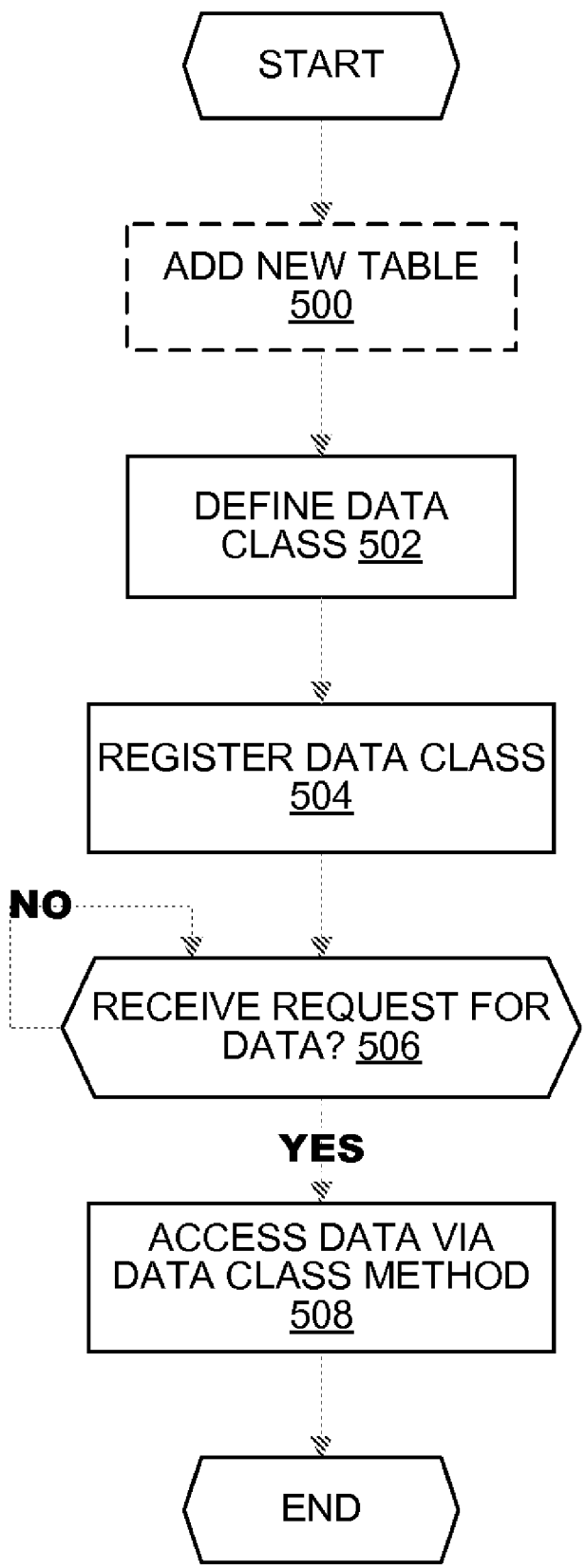
FIG. 5 depicts an example procedure for executing a human capital management system in accordance with an embodiment of the present invention.

FIG. 5 depicts an example procedure for executing a human capital management system in accordance with an embodiment of the present invention. The procedure may execute on a system as depicted in FIG. 4 and provide a customized table directory to facilitate access to data stored in a database of the HCM system. Data may be stored in customized tables in the database. The HCM system may include tools that provide functionality, such as forms and scenarios or processes to a user. Data access by the tools may be channeled through data classes, as discussed above.

In 500, the HCM system may optionally add a new table. For example, the new table may be a customized table storing data associated with a tool class or data class within the HCM system. One or more new tables may be created when a new data class is created, and a new data class may be created to support functionality of a new tool class.

In 502, a data class may be defined by a programmer. For example, a data class may be as discussed above and include a class definition, methods, and properties. The data class may define data objects that can be instantiated in the HCM system, each data object providing access to data in the database.

In 504, the data class may be registered in a customized table directory. The customized table directory may store information on all data classes within the HCM system, as discussed above. A customized table directory facilitates access to data by allowing easy lookup of all data classes associated with a tool. With that information, an appropriate method may be invoked from each of the associated data classes.

In 506, the data class may receive a request for data. For example, the request may be received from a tool in the HCM system, as discussed above.

In 508, the data class may provide access to data stored in the database via a defined method. Additionally, the data class may invoke methods of dependent object classes and an abstract base class, as discussed above.

An example embodiment of the present invention may be a method for accessing customized tables in a database of a computer application. The method may include defining a data class, the data class to interface between a tool of the computer application and a table in the database, wherein the computer application is configured to automated human resource processes. The method may include registering the data class in a custom table directory. The method may include responsive to a request for data from the tool, invoking a method of the data class to access data stored in the table. The computer application may execute on a server and communicate with at least one terminal over a network. The computer application may be a human capital management application and the terminal may be accessible to a user. The data class may provide functionality associated with a tool class, wherein the tool is instantiated from the tool class. The functionality may include reading data, renaming an object, copying an object, and modifying entries. The method may include adding a new table to the database. The method may include defining a new data class, the new data class to interface between the tool and the new table. The method may include registering the new data class in the custom table directory. The method may include defining an abstract class, the abstract class defining the custom table directory and a common functionality interface, wherein the data class is inherited from abstract class.

Another example embodiment of the present invention may be a system for accessing customized tables in a database of a computer application. The system may include a memory. The system may include a processor in communication with the memory. The processor may be configured to, responsive to programmer input, define a data class in memory, the data class to interface between a tool of the computer application and a table in the database, wherein the computer application is configured to automated human resource processes. The processor may be configured to register the data class in a custom table directory stored in memory. The processor may be configured to responsive to a request for data from the tool, invoking a method of the data class to access data stored in the table. The system may include a server. The system may include a terminal, wherein the computer application executes on the server and communicates with the terminal over a network. The computer application may be a human capital management application and the terminal is accessible to a user. The data class may provide functionality associated with a tool class, wherein the tool is instantiated from the tool class. The functionality may include reading data, renaming an object, copying an object, and modifying entries. The processor may be configured to add a new table to the database. The processor may be configured to define a new data class, the new data class to interface between the tool and the new table. The processor may be configured to register the new data class in the custom table directory. The processor may be configured to define an abstract class, the abstract class defining the custom table directory and a common functionality interface, wherein the data class is inherited from abstract class.

Another example of the present invention may be a computer-readable medium including instructions adapted to execute a method for accessing customized tables in a database of a computer application. The method may include defining a data class, the data class to interface between a tool of the computer application and a table in the database, wherein the computer application is configured to automated human resource processes. The method may include registering the data class in a custom table directory. The method may include responsive to a request for data from the tool, invoking a method of the data class to access data stored in the table. The computer application may execute on a server and communicate with at least one terminal over a network. The computer application may be a human capital management application and the terminal may be accessible to a user. The data class may provide functionality associated with a tool class, wherein the tool is instantiated from the tool class. The functionality may include reading data, renaming an object, copying an object, and modifying entries. The method may include adding a new table to the database. The method may include defining a new data class, the new data class to interface between the tool and the new table. The method may include registering the new data class in the custom table directory. The method may include defining an abstract class, the abstract class defining the custom table directory and a common functionality interface, wherein the data class is inherited from abstract class.

It should be understood that there exist implementations of other variations and modifications of the invention and its various aspects, as may be readily apparent to those of ordinary skill in the art, and that the invention is not limited by specific embodiments described herein. Features and embodiments described above may be combined. It is therefore contemplated to cover any and all modifications, variations, combinations or equivalents that fall within the scope of the basic underlying principals disclosed and claimed herein.

What is claimed is:

1. A method for accessing customized tables in a database of a computer application, comprising:
adding a customized table for storing data to the database, the customized table requiring special functionality;
registering a data class associated with the customized table in a custom table directory;

defining the data class, the data class to interface between a tool of the computer application associated with a tool class and the customized table in the database, wherein the defined data class is associated with the tool class and the data class defines functionality implemented by a method related to the defined data class and provides the tool access to data in the database, and the tool class defines the specialized functionality required for the customized table, the specialized functionality identified with a code associated with the tool class;

defining new methods within the data class to interface between a tool class and the customized table;

registering the customized table and the defined data class in the customized table directory by associating the defined data class with the customized table;

instantiating a tool from the tool class to operate on data, the tool accessing customized table directory to retrieve the data classes associated with the tool class; and responsive to a request for data from the tool, invoking the newly defined method providing functionality associated with the retrieved data classes and the request to access data stored in the customized table, wherein the computer application is a human capital management application and a terminal receives inputs related to the stored data.

2. The method of claim 1, wherein the computer application executes on a server and communicates with at least one terminal over a network.

3. The method of claim 1, wherein the functionality includes reading data, renaming an object, copying an object, and modifying entries.

4. The method of claim 1, further comprising:
defining an abstract class, the class defining the custom table directory and a common functionality interface, whereint he data class is inherited from an abstract base class.

5. The method of claim 4, further comprising:
adding a new object type by creating an additional data class inheriting from the abstract base class.

6. A system for accessing customized tables in a database of a computer application, comprising:
a memory, and
a processor in communication with the memory, the processor configured to, responsive to programmer input,
add a new customized table to the database, the customized table requiring specialized functionality;
register the new table in the custom table directory; and
defining new methods within a data class to interface between a tool class and the new table, the tool class defines the specialized functionality required for the customized table, the specialized functionality identified with a code associated with the tool class;
define the data class in memory, the data class to interface between a tool of the computer application and a table in the database, and provides the tool access to data in the database, and wherein the computer application is configured to automated human resource processes,
register the data class in a custom table directory stored in memory, and
responsive to a request for data from the tool, invoking a method of the data class to access data stored in the table, wherein the computer application is a human capital management application and a terminal receives inputs related to the stored data.

7. The system of claim 6, further comprising:
a server; and
a terminal, wherein the computer application executes on the server and communicates with the terminal over a network.

8. The system of claim 7, the processor further configured to,
define an abstract class, the abstract class defining the custom table directory and a common functionality interface, wherein the data class is inherited from abstract class; and
create a second data class inheriting from the abstract base class.

9. The system of claim 6, wherein data class providing functionality associated with a tool class, wherein the tool is instantiated from the tool class.

10. The system of claim 9, wherein the functionality includes reading data, renaming an object, copying an object, and modifying entries.

11. A computer-readable storage medium including instructions adapted to execute a method for accessing customized tables in a database of a computer application, the method including,
adding a customized table for storing data to the database;
registering a data class associated with the customized table in a custom table directory;
defining the data class, the data class to interface between a tool of the computer application associated with a tool class and the customized table in the database, wherein the defined data class is associated with the tool class and the data class defines functionality implemented by a method related to the defined data class and provides the tool access to data in the database, and the tool class defines specialized functionality required for the customized table, the specialized functionality identified with a code associated with the tool class;
defining new methods within the data class to interface between a tool class and the customized table;
registering the customized table and the defined data class in the customized table directory by associating the defined data class with the customized table;
instantiating a tool from the tool class to operate on data, the tool accessing customized table directory to retrieve the data classes associated with the tool class; and
responsive to a request for data from the tool, invoking the newly defined method providing functionality associated with the retrieved data classes and the request to access data stored in the customized table, wherein the computer application is a human capital management application and a terminal receives inputs related to the stored data.

12. The storage medium of claim 11, wherein the computer application executes on a server and communicates with at least one terminal over a network.

13. The storage medium of claim 11, wherein the functionality includes reading data, renaming an object, copying an object, and modifying entries.

14. The storage medium of claim 11, the method further comprising:
defining an abstract class, the abstract class defining the custom table directory and a common functionality interface, wherein the data class is inherited from an abstract base class.

15. A system for accessing customized tables in a database of a computer application, comprising:
a memory, and
a processor in communication with the memory, the processor configured to:

add a customized table for storing data to the database, the customized table requiring specialized functionality;

define a data class in memory, the data class to interface between a tool of the computer application and a table in the database, the defined data class providing functionality associated with a tool class, wherein the tool is instantiated from the tool class, and the tool class defines the specialized functionality required for the customized table, the specialized functionality identified with a code associated with the tool class;

register the data class in a customized table directory stored in memory;

responsive to a user input requesting data, instantiate the tool from the tool class to obtain the data; and responsive to a request for data from the tool, invoking a method of the data class to access data stored in the table according to the user input, wherein the computer application is a human capital management application and a terminal receives inputs related to the stored data.

* * * * *